(12) United States Patent
Hiratani et al.

(10) Patent No.: US 8,596,245 B2
(45) Date of Patent: Dec. 3, 2013

(54) FUEL INJECTION CONTROL DEVICE OF ENGINE

(75) Inventors: Yusuke Hiratani, Fujisawa (JP);
Futoshi Nakano, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 583 days.

(21) Appl. No.: 12/989,709

(22) PCT Filed: Mar. 24, 2009

(86) PCT No.: PCT/JP2009/055792
§ 371 (c)(1),
(2), (4) Date: Oct. 26, 2010

(87) PCT Pub. No.: WO2009/133737
PCT Pub. Date: Nov. 5, 2009

(65) Prior Publication Data
US 2011/0040474 A1    Feb. 17, 2011

(30) Foreign Application Priority Data
Apr. 28, 2008 (JP) .................................. 2008-116948

(51) Int. Cl.
*F02M 7/00* (2006.01)
*F02B 3/00* (2006.01)

(52) U.S. Cl.
USPC .......................................... 123/436; 123/299

(58) Field of Classification Search
USPC .......... 123/436, 478, 480, 490; 701/102, 103, 701/110
See application file for complete search history.

(56) References Cited

U.S. PATENT DOCUMENTS 6,328,014 B1 * 12/2001 Bradshaw ...................... 123/300
6,755,176 B2 * 6/2004 Takeuchi et al. .............. 123/299
(Continued)

FOREIGN PATENT DOCUMENTS

JP         07-63104 A      3/1995
JP        2001-349243    12/2001
JP        2003-27995 A    1/2003
(Continued)

OTHER PUBLICATIONS

PCT Search Report for U.S. Appl. No. PCT/JP2009/055792 dated Apr. 21, 2009.

*Primary Examiner* — Thomas Moulis
(74) *Attorney, Agent, or Firm* — McCormick, Paulding & Huber LLP

(57) ABSTRACT

Increase in combustion noise and deterioration of exhaust gas performance caused by inter-cylinder correction are prevented, and decrease in temperature rise performance of a diesel particulate removal device caused by inter-cylinder correction is prevented. A fuel injection control device of an engine comprises inter-cylinder correction amount calculation means 5 for calculating, for each cylinder, an inter-cylinder correction amount for correcting by increasing/decreasing a fuel injection amount in each cylinder according to a difference in engine revolution speed between the cylinders, inter-cylinder correction amount division means 6 for dividing the inter-cylinder correction amount into a first divided inter-cylinder correction amount for correcting by increasing/decreasing the basic injection amounts of main injection and sub-injection and a second divided inter-cylinder correction amount for correcting by increasing/decreasing only the basic injection amount of main injection, first correction means 7 for distributing the first divided inter-cylinder correction amount to main injection and sub-injection according to the basic injection amount of main injection and sub-injection, and second correction means 8 for adding the second divided inter-cylinder correction amount to the basic injection amount of main injection.

5 Claims, 2 Drawing Sheets

(56) References Cited

U.S. PATENT DOCUMENTS

| | | |
|---|---|---|
| 6,962,140 B1 | 11/2005 | Nakai et al. |
| 7,373,918 B2 * | 5/2008 | Uchiyama ............... 123/299 |
| 7,769,535 B2 * | 8/2010 | Ullrich et al. ............ 701/110 |
| 2008/0103675 A1 * | 5/2008 | Ishizuka et al. .......... 701/103 |
| 2008/0308065 A1 * | 12/2008 | Imai ........................ 123/299 |

FOREIGN PATENT DOCUMENTS

| | | |
|---|---|---|
| JP | 2005-248739 A | 9/2005 |
| JP | 2007-170246 A | 7/2007 |

* cited by examiner

FUEL INJECTION CONTROL DEVICE OF ENGINE

CROSS REFERENCE TO RELATED APPLICATIONS

This application is entitled to the benefit of and incorporates by reference essential subject matter disclosed in International Patent Application No. PCT/JP2009/055792 filed on Mar. 24, 2009 and Japanese Patent Application No. 2008-116948 filed Apr. 28, 2008.

TECHNICAL FIELD

The present invention relates to a fuel injection control device of an engine which has a plurality of cylinders and in which main injection and sub-injection performed before the main injection or after the main injection are implemented in one cycle for each cylinder.

BACKGROUND ART

In an engine having a plurality of cylinders (multicylinder engine) such as a diesel engine, a difference in fuel injection amount between the cylinders can be caused by aging deterioration of fuel injection devices (injectors) provided in the cylinders or individual differences therebetween. The difference in fuel injection amount between the cylinders is demonstrated as fluctuations of engine revolution speed such that the engine revolution speed attained when combustion takes place in each cylinder is different for each cylinder.

In order to inhibit such fluctuations of engine revolution speed occurring among the cylinders, correction of fuel injection amount among the cylinders is performed by increasing or decreasing the fuel injection amount in each cylinder in response to fluctuations of engine revolution speed among the cylinders (see Japanese Patent Application Laid-open No. 2001-349243).

For example, when multistage injection (main injection, sub-injection) is implemented in one cycle, a basic injection amount of main injection and a basic injection amount of sub-injection (pilot injection, post injection) are calculated according to the engine operation state, and an inter-cylinder correction amount for conducting increase-decrease correcting the fuel injection amount in each cylinder is calculated for each cylinder according to a difference in engine revolution speed detected between the cylinders, (Correction A) correction of fuel injection amount (main injection, sub-injection) among the cylinders is performed by distributing the inter-cylinder correction amounts of cylinders to main injection and sub-injection according to the basic injection amount of main injection and sub-injection, or (Correction B) correction of fuel injection amount (only main injection) among the cylinders is performed by adding all the inter-cylinder correction amounts of cylinders to the basic injection amount of main injection.

DISCLOSURE OF THE INVENTION

Where inter-cylinder correction is performed by the above-described correction A, when pilot injection is performed to reduce combustion noise in a medium- and high-load range of the engine, the fuel injection amount of pilot injection is greatly increased or decreased by the inter-cylinder correction, the effect of combustion noise reduction by pilot injection can be greatly affected, and the combustion noise is increased or exhaust gas performance can deteriorate.

Where inter-cylinder correction is performed by the above-described correction B, when post injection is conducted to regenerate (reactivate the catalyst), a diesel particulate removal device (post-treatment device) in a low-load range of the engine, the fuel injection amount of main injection is greatly decreased by the inter-cylinder correction, the combustion at main injection ends before the post injection starts, the combustion at post injection misfires, and the temperature cannot be raised to a level necessary to regenerate the post-treatment device (reactivate the catalyst).

Accordingly, it is an object of the present invention to provide a fuel injection control device of an engine that can prevent the increase in combustion noise and degradation of exhaust gas performance and also can prevent the decrease in temperature increase performance of the post-treatment device by inhibiting abrupt fluctuations of fuel injection amount in each injection of main injection and sub-injection caused by inter-cylinder correction.

In order to attain the above-described object, the present invention provides a fuel injection control device of an engine which has a plurality of cylinders and in which main injection and sub-injection performed before the main injection or after the main injection are implemented in one cycle for each cylinder, the fuel injection control device comprising main basic injection amount calculation means for calculating a basic injection amount of main injection according to an operation state of the engine; sub basic injection amount calculation means for calculating a basic injection amount of sub-injection according to the operation state of the engine; inter-cylinder correction amount calculation means for calculating, for each of the cylinders, an inter-cylinder correction amount for correcting by increasing/decreasing a fuel injection amount in each of the cylinders according to a difference in engine revolution speed between the cylinders; inter-cylinder correction amount division means for dividing the inter-cylinder correction amount into a first divided inter-cylinder correction amount for correcting by increasing/decreasing the basic injection amounts of main injection and sub-injection and a second divided inter-cylinder correction amount for correcting by increasing/decreasing only the basic injection amount of main injection; first correction means for distributing the first divided inter-cylinder correction amount to main injection and sub-injection according to the basic injection amount of main injection and sub-injection; and second correction means for adding the second divided inter-cylinder correction amount to the basic injection amount of main injection.

Here, ratio variation means may be provided for varying a ratio of the first divided inter-cylinder correction amount and the second divided inter-cylinder correction amount according to the operation state of the engine.

Further, the ratio variation means may vary a ratio of the first divided inter-cylinder correction amount and the second divided inter-cylinder correction amount so that the ratio of the first divided inter-cylinder correction amount in the inter-cylinder correction amount decreases and the ratio of the second divided inter-cylinder correction amount in the inter-cylinder correction amount increases as a load of the engine increases.

Further, the sub-injection may be pilot injection in a relatively small amount performed prior to the main injection in a relatively large amount with the object of inhibiting abrupt initial combustion caused by the main injection.

Further, a post-treatment device having a catalyst and disposed in an exhaust gas passage of the engine may be provided, and the sub-injection may be post injection performed after the main injection with the object of increasing the temperature of exhaust gas and activating the catalyst of the post-treatment device.

The effect demonstrated according to the present invention is that the increase in combustion noise and degradation of exhaust gas performance can be prevented and also the decrease in temperature can be prevented to increase performance of the post-treatment device by inhibiting abrupt fluctuations of fuel injection amount in each injection of main injection and sub-injection caused by inter-cylinder correction.

BEST MODE FOR CARRYING OUT THE INVENTION

A preferred embodiment of the present invention will be explained below in greater detail with reference to the appended drawings.

Figure 1:
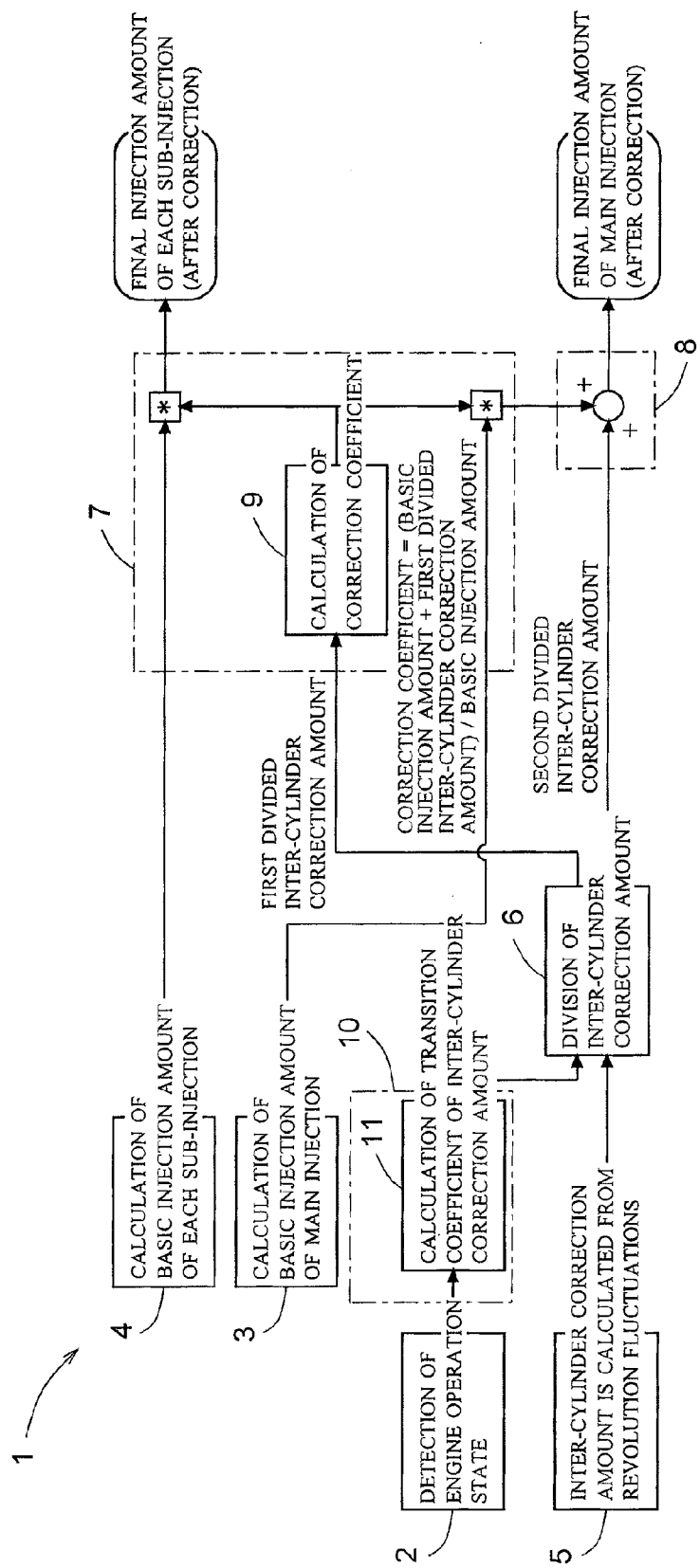
FIG. 1 is a block diagram illustrating an embodiment of a fuel injection control device of an engine in accordance with the present invention.

FIG. 1 is a block diagram illustrating an embodiment of a fuel injection control device for an engine in accordance with the present invention.

Figure 2:
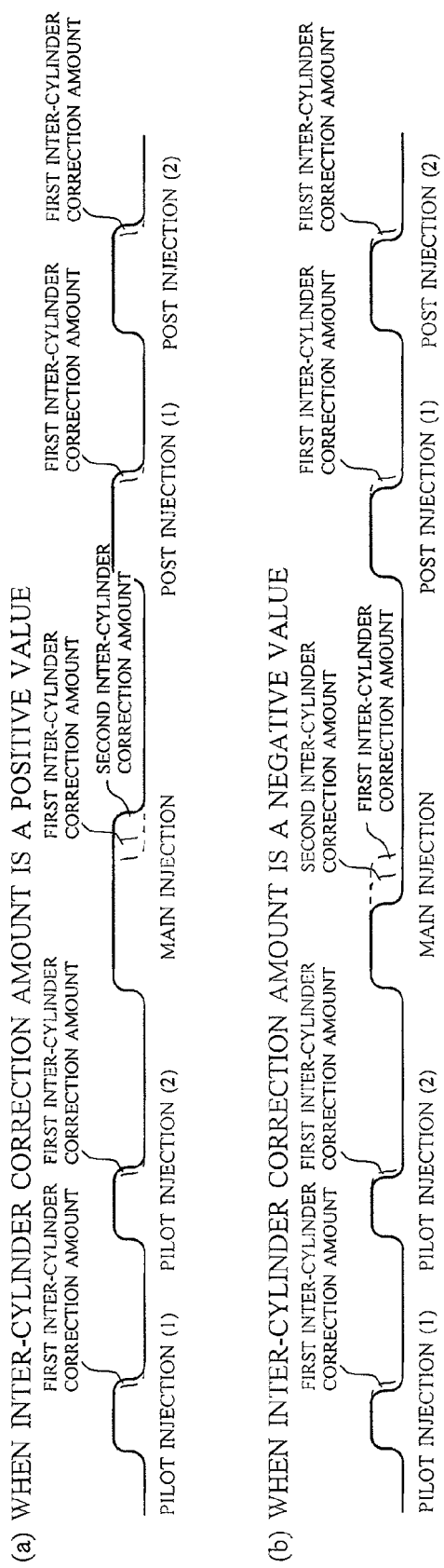
FIGS. 2(a) and (b) each show a time flowchart indicating the final injection amount of each injection of main injection and sub-injection.

The engine of the present embodiment is a multicylinder diesel engine having a plurality of cylinders. A fuel injection control device 1 of the present embodiment has a multistage fuel injection mode in which fuel injection by a fuel injection device (injector) is performed in one cycle for each cylinder with a division into a plurality of cycles including main injection, sub-injection (pilot injection) performed before the main injection, and sub-injection (post injection) performed after the main injection (see FIG. 2). The pilot injection in a relatively small amount performed prior to the main injection in a relatively large amount inhibits rapid increase in pressure inside the cylinder and rapid initial combustion caused by the main injection, inhibits the generation of NOx, and reduces the combustion noise. Further, the post injection performed after the main injection can increase the temperature of exhaust gas and sufficiently activate the catalyst of the post-treatment device.

The fuel injection control device 1 of the present embodiment comprises engine operation state detection means 2 for detecting an operation state of the engine on the basis of a revolution speed of the engine; an accelerator depression degree or the like; main basic injection amount calculation means 3 for calculating a basic injection amount of main injection according to the operation state of the engine detected by the engine operation state detection means 2; sub basic injection amount calculation means 4 for calculating a basic injection amount of each sub-injection (pilot injection, post injection) according to the operation state of the engine detected by the engine operation state detection means 2; and inter-cylinder correction amount calculation means 5 for calculating for each cylinder an inter-cylinder correction amount for correcting by increasing/decreasing a fuel injection amount in the cylinders according to a difference in engine revolution speed between the cylinders.

The fuel injection control device 1 of the present embodiment is provided with inter-cylinder correction amount division means 6 for dividing the inter-cylinder correction amount calculated by the inter-cylinder correction amount calculation means 5 into a first divided inter-cylinder correction amount for correcting by increasing/decreasing the basic injection amounts of main injection and sub-injection and a second divided inter-cylinder correction amount for correcting by increasing/decreasing only the basic injection amount of main injection, first correction means 7 for distributing the first divided inter-cylinder correction amount divided by the inter-cylinder correction amount division means 6 to main injection and sub-injection according to the basic injection amount of main injection and sub-injection, and second correction means 8 for adding the second divided inter-cylinder correction amount divided by the inter-cylinder correction amount division means 6 to the basic injection amount of main injection.

In the present embodiment, the first correction means 7 has correction coefficient calculation means 9 for calculating a correction coefficient by the basic injection amounts of main injection and each sub-injection and the first divided inter-cylinder correction amount. More specifically, the correction coefficient calculation means 9 calculates the correction coefficient by dividing the sum total of the basic injection amounts of main injection and each sub-injection and the first divided inter-cylinder correction amount by the sum total of basic injection amounts of main injections and sub-injections. The first correction means 7 multiplies the basic injection amount of main injection by the correction coefficient and multiplies the basic injection amount of each sub-injection by the correction coefficient, thereby correcting by increasing/decreasing the basic injection amounts of main injection and sub-injection.

The fuel injection control device 1 of the present embodiment also comprises ratio variation means 10 for varying a ratio of the first divided inter-cylinder correction amount and the second divided inter-cylinder correction amount according to the operation state of the engine detected by the engine operation state detection means 2. In the present embodiment, the ratio variation means 10 comprises transition coefficient calculation means 11 for calculating a transition coefficient to be used when the inter-cylinder correction amount is divided into the first divided inter-cylinder correction amount and the second divided inter-cylinder correction amount. In the present embodiment, the aforementioned transition coefficient is set such that the ratio of the first divided inter-cylinder correction amount in the inter-cylinder correction amount of each cylinder decreases and the ratio of the second divided inter-cylinder correction amount in the inter-cylinder correction amount of each cylinder increases as the load of the engine increases. The ratio variation means 10 varies the first divided inter-cylinder correction amount and the second divided inter-cylinder correction amount according to the transition coefficient.

The function of the present invention having the above-described configuration will be described below.

As shown in FIGS. 2(a) and (b), the final injection amount of main injection is found by adding a correction amount obtained by distributing the first divided inter-cylinder correction amount according to the basic injection amounts of main injection and sub-injection and the second divided inter-cylinder correction amount to the basic injection amount of main injection, and the final injection amount of sub-injection is determined by adding a correction amount obtained by distributing the first divided inter-cylinder correction amount according to the basic injection amounts of main injection and sub-injection to the basic injection amount of sub-injection.

When the difference in engine revolution speed between the cylinders does not increase as the correction of fuel injection amount in each cylinder becomes necessary, the correction of fuel injection amount between the cylinders is not performed, the basic injection amount of main injection calculated by the main basic injection amount calculation means 3 is determined as the final injection amount of main injection, and the basic injection amount of sub-injection calculated by the sub basic injection amount calculation means 4 is determined as the final injection amount of sub-injection.

In the high- and medium-load range of the engine, the ratio of the first divided inter-cylinder correction amount in the inter-cylinder correction amount of each cylinder is decreased by the transition coefficient (ratio of the second divided inter-cylinder correction amount is increased), and the correction amount of the basic injection amount of sub-injection becomes less than that in the case of a low-load range. Therefore, the fuel injection amount of pilot injection is not greatly increased or decreased by inter-cylinder correction and the effect produced by pilot injection on reduction of combustion noise is not adversely affected. Therefore, the increase in combustion noise and deterioration of exhaust gas performance can be avoided. Further, the correction amount of basic injection amount of sub-injection is decreased by comparison with that in the case in which the inter-cylinder correction amount is not divided into the first divided inter-cylinder correction amount and the second divided inter-cylinder correction amount and the inter-cylinder correction amount as a whole is distributed to main injection and sub-injection according to the basic injection amount of main injection and sub-injection.

By contrast, in a low-load range of the engine, the ratio of the first divided inter-cylinder correction amount in the inter-cylinder correction amount of each cylinder is increased by the transition coefficient (ratio of the second divided inter-cylinder correction amount is decreased) and the correction amount of basic injection amount of main injection becomes less than that in the high- and medium-load range. Therefore, the inter-cylinder correction causes no significant decrease in the fuel injection amount of main injection and misfire of combustion in post injection occurring when the combustion in main injection ends before the post injection is started can be prevented. As a result, the temperature can be increased to a level necessary to regenerate the post-treatment device (activate the catalyst). Further, the correction amount of basic injection amount of main injection is decreased by comparison with that in the case in which the inter-cylinder correction amount is divided into the first divided inter-cylinder correction amount and the second divided inter-cylinder correction amount and the inter-cylinder correction amount as a whole is added to the basic injection amount of main injection.

Further, by adequately varying the ratio of the first divided inter-cylinder correction amount and the second divided inter-cylinder correction amount according to the aforementioned transmission coefficient, it is possible to inhibit abrupt variations in the fuel injection amount of each injection of main injection and sub-injection caused by inter-cylinder correction, prevent the increase in combustion noise and deterioration of exhaust gas performance, and prevent the decrease in temperature to increase performance of the post-treatment device.

The preferred embodiment of the present invention is described above, but the present invention is not limited to the above-described embodiment and various other embodiments thereof can be used.

What is claimed is:

1. A fuel injection control device of an engine which has a plurality of cylinders and in which main injection and sub-injection performed before the main injection or after the main injection are implemented in one cycle for each cylinder, the fuel injection control device comprising:

main basic injection amount calculation means for calculating a basic injection amount of main injection according to an operation state of the engine;

sub basic injection amount calculation means for calculating a basic injection amount of sub-injection according to the operation state of the engine;

inter-cylinder correction amount calculation means for calculating, for each of the cylinders, an inter-cylinder correction amount for correcting by increasing/decreasing a fuel injection amount in each of the cylinders according to a difference in engine revolution speed between the cylinders;

inter-cylinder correction amount division means for dividing the inter-cylinder correction amount into a first divided inter-cylinder correction amount for correcting by increasing/decreasing the basic injection amounts of main injection and sub-injection and a second divided inter-cylinder correction amount for correcting by increasing/decreasing only the basic injection amount of main injection;

first correction means for distributing the first divided inter-cylinder correction amount to main injection and sub-injection according to the basic injection amount of main injection and sub-injection; and second correction means for adding the second divided inter-cylinder correction amount to the basic injection amount of main injection.

2. The fuel injection control device of an engine according to claim 1, comprising ratio variation means for varying a ratio of the first divided inter-cylinder correction amount and the second divided inter-cylinder correction amount according to the operation state of the engine.

3. The fuel injection control device of an engine according to claim 2, wherein the ratio variation means varies a ratio of the first divided inter-cylinder correction amount and the second divided inter-cylinder correction amount so that the ratio of the first divided inter-cylinder correction amount in the inter-cylinder correction amount decreases and the ratio of the second divided inter-cylinder correction amount in the inter-cylinder correction amount increases as a load of the engine increases.

4. The fuel injection control device of an engine according to claim 1, wherein the sub-injection is pilot injection in a relatively small amount performed prior to the main injection in a relatively large amount with the object of inhibiting abrupt initial combustion caused by the main injection.

5. The fuel injection control device of an engine according to claim 1, comprising a post-treatment device having a catalyst and disposed in an exhaust gas passage of the engine, wherein the sub-injection is post injection performed after the main injection with the object of increasing the temperature of exhaust gas and activating the catalyst of the post-treatment device.

* * * * *